UNITED STATES PATENT OFFICE.

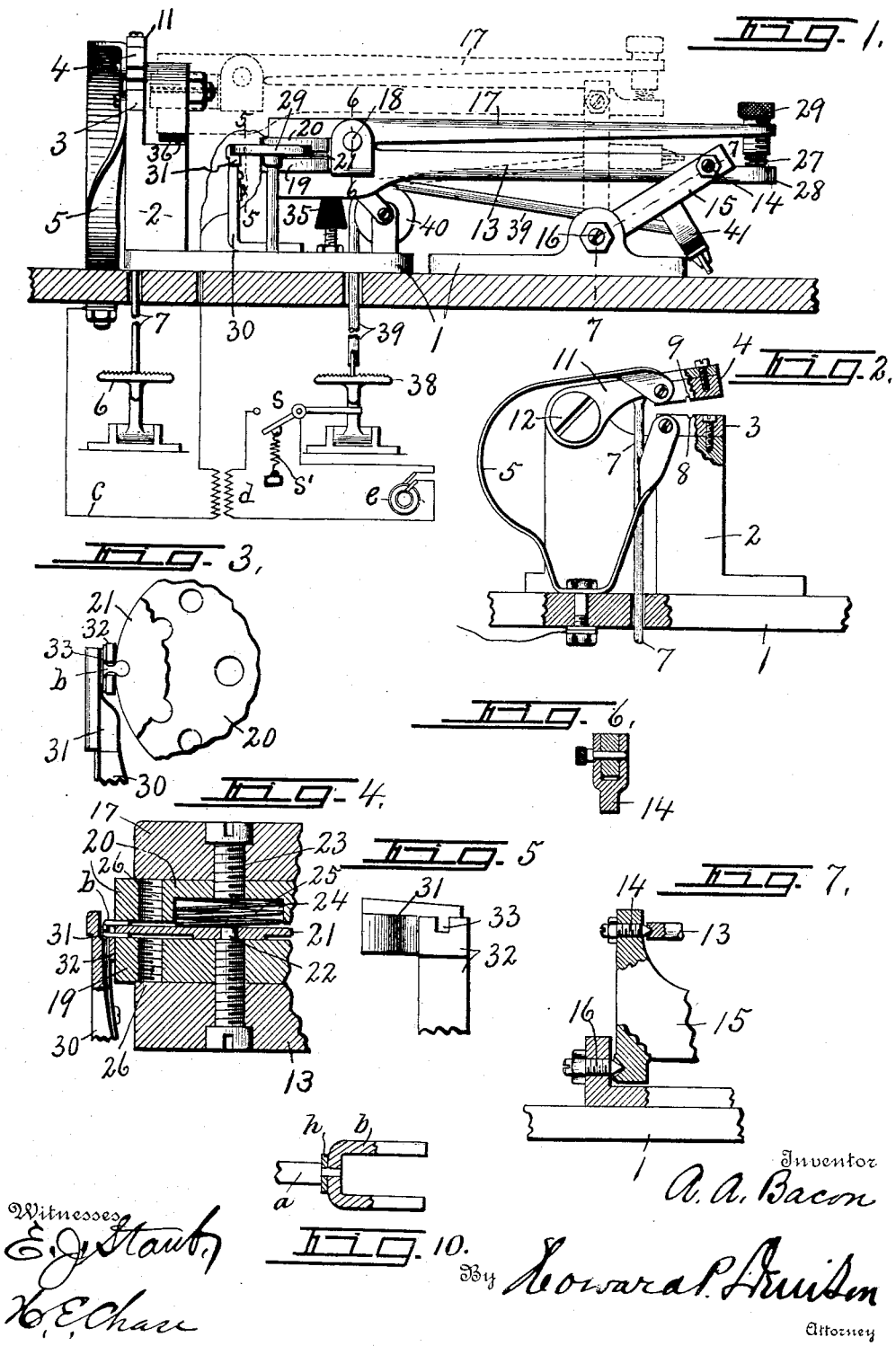

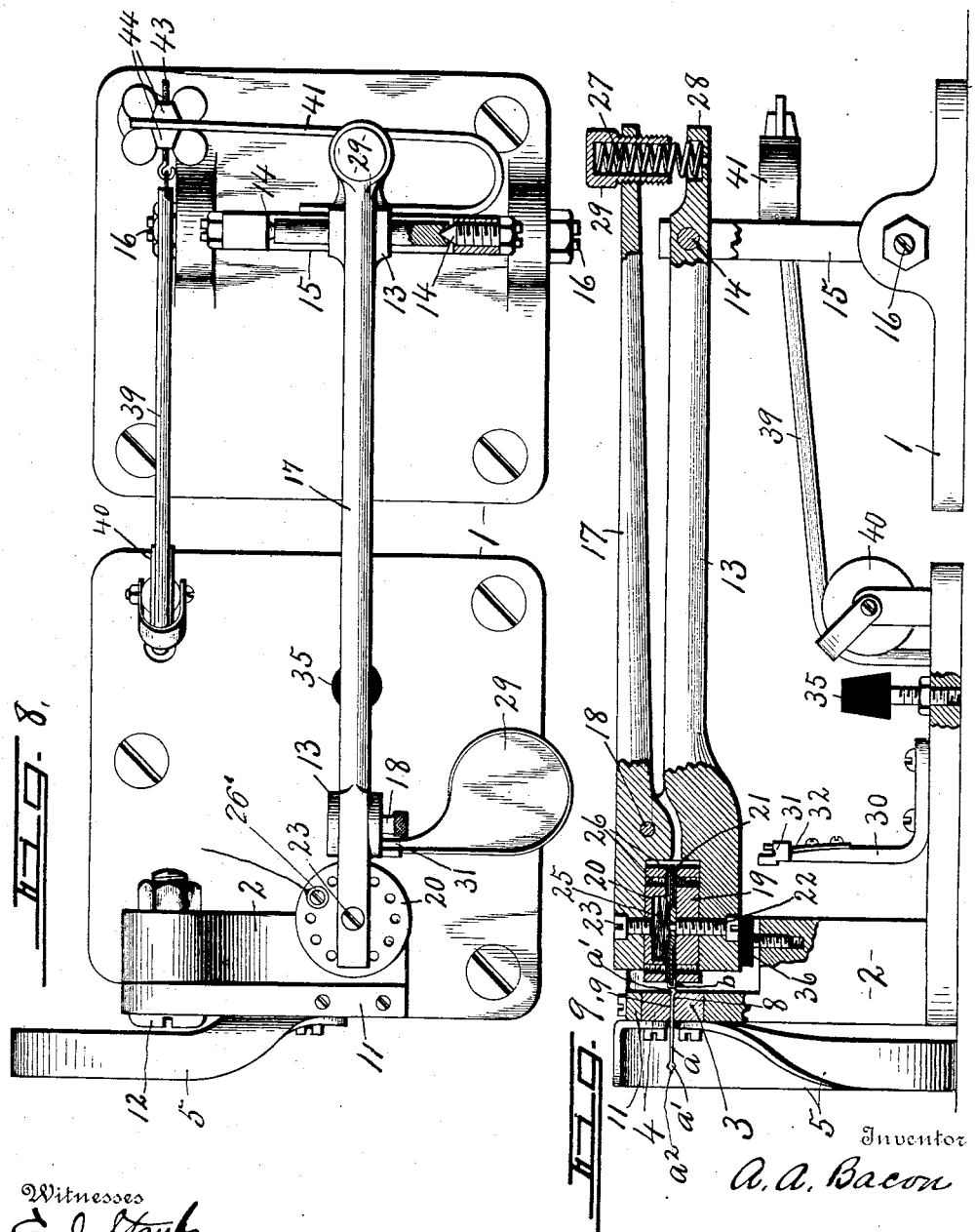

ARTHUR AVERY BACON, OF GENEVA, NEW YORK, ASSIGNOR TO THE STANDARD OPTICAL COMPANY, OF GENEVA, NEW YORK, A CORPORATION OF NEW YORK.

ELECTRIC SOLDERING-MACHINE.

1,176,420.   Specification of Letters Patent.   Patented Mar. 21, 1916.

Application filed November 13, 1911. Serial No. 659,991.

*To all whom it may concern:*

Be it known that I, ARTHUR AVERY BACON, of Geneva, in the county of Ontario, in the State of New York, have invented new and useful Improvements in Electric Soldering-Machines, of which the following, taken in connection with the accompanying drawings, is a full, clear, and exact description.

This invention relates to certain improvements in electric soldering and involves both the method of and apparatus for electrically uniting the relatively small parts of lens mountings for eye glasses, spectacles and similar articles of manufacture by solder or equivalent material which is fusible under a comparatively low degree of heat. These mountings are usually made of non-corrodible metals such as gold alloys, " gold-filled " German silver and their equivalents having a certain degree of hardness or temper to give the various parts of the mountings the required stiffness and resiliency and still remain sufficiently ductile to permit them to be easily adjusted within a limited range by slight bending. Heretofore so far as I am aware these parts have been soldered together by manually holding them in contact with each other with their contacting points or surfaces (and a small quantity of interposed solder) within the pencil-like flame of a suitable gas burner until the solder is fused and spread over such points or surfaces, after which the joined parts are removed from the flame to allow the solder to cool or set. This "flame process" is not only slow, laborious and more or less uncertain in its results but requires a long experience and considerable skill to enable the operator to properly position the parts relatively to each other and to the flame during the soldering operation so that such parts will be accurately assembled when the solder is set. Another and more serious result of this "flame process" of soldering is that considerable portions of the metal adjacent the points of contact are necessarily brought directly into the flame, which together with the usual high heat conductivity causes heating of the metal sufficient to draw the temper and thereby destroy the rigidity and resiliency of the main bodies.

The main object, therefore, of my present invention is to confine the heat as closely to the contacting surface as possible and to avoid the transmission of such heat to the main bodies of the parts for the purpose of preserving the inherent stiffness and resiliency of the united parts.

Another object is to provide simple means for holding the parts in their exact relative positions in which they are to be assembled during the soldering operation so as to render any subsequent adjustment of the joint unnecessary.

A still further object is to effect the union of the parts electrically under a very low voltage or current pressure which incidentally renders the use of the machine perfectly safe in the hands of unskilled operators and also prevents arcing of the circuits across the gap between the holding devices and at other points where a short circuit may exist from a higher voltage.

Another object is to provide mechanical means for automatically registering one part with the other part without especial attention from the operator.

Other objects and uses will be brought out in the following description.

In the drawings, Figure 1 is a front elevation of one form of apparatus for carrying out the herein described process and adapted more particularly for uniting the lens posts of rimless eyeglasses to the nose bridge, the parts being shown in their normal positions. Fig. 2 is an elevation of the left hand end of the same apparatus omitting the electric circuits and operating treadles for the movable parts. Fig. 3 is an enlarged top plan of the feed guide for the lens posts and a portion of the pick up clamp for clamping and carrying the lens post to the other set of clamping members which engage and hold the nose bridge. Fig. 4 is a vertical sectional view of the same guide and clamp shown in Fig. 3. Figs. 5, 6, and 7 are enlarged transverse vertical sectional views of parts of the same machine taken respectively on lines 5—5, 6—6 and 7—7, Fig. 1. Fig. 8 is an enlarged top plan of the machine shown in Fig. 1, the parts being in position for soldering the post to the nose bridge. Fig. 9 is a longitudinal vertical sectional view of the same machine taken on line 10—10, Fig. 9. Fig. 10 is a detail sectional view of the assembled parts of a lens mounting showing the solder washer between the parts to be connected.

The method of soldering the parts to be united briefly stated consists in gripping the parts close to the points of surfaces which are to be united and bringing such points or surfaces together with a suitable quantity of solder into contact by means of relatively large gripping members of low electrical resistance and high heat conductivity connected in a low voltage circuit for the purpose of dissipating heat and concentrating the low voltage current energy at the contacting surfaces of the parts to be united.

The apparatus shown for carrying out this process comprises a main supporting frame —1— of suitable material having at one end an upright bracket —2— upon which is mounted a fixed jaw —3— for coaction with a corresponding movable jaw —4—, said jaws serving to clamp between them a nose bridge —a— for holding the latter firmly in a fixed position during the application of a lens post —b— to one end thereof. The movable jaw —4— is normally forced to its open position by means of a spring —5— and may be closed by any suitable power device, as, for example, a treadle —6— and suitable connections —7— between the treadle and jaw —4—. The meeting faces of these jaws —3— and —4— are provided with transverse grooves —8— and —9— which register with each other when the jaws are closed for engaging opposite edges of the bridge piece —a— and holding it edgewise vertically in a fixed position.

The ends of the bridge piece —a— are provided with enlarged heads —a'— and reduced pintles —a²— projecting axially from the outer side of the head and adapted to enter central apertures in the lens posts —b— as shown more clearly in Fig. 4.

The spring —5— which forms a common electrical connection to both of the gripping members —3— and —4— is preferably made of tempered copper or copper bronze or equivalent material of high electric conductivity electrically connected by a wire —c— to one side of the secondary winding of a transformer —d—, the primary winding of which is connected to a source of electric energy —e—, the object being to unite the parts of the lens mounting under a low electro-motive force capable of developing just sufficient heat to quickly fuse the solder without excessively heating any more of such parts than their contacting points or surfaces. With this same object in view, the gripping members —3— and —4— are relatively large as compared with the cross sectional area of the part or bridge piece —a— and are preferably made of copper bronze or similar material of low electrical resistance and high heat conductivity capable of dissipating any heat which may be transmitted thereto during the soldering operation, the gripping member —3— being secured to the bracket —2— which is of cast iron while the gripping member —4— is secured to a cast iron arm —11— which is pivoted at —12— to the bracket —2— as best seen in Fig. 2.

A carrier arm —13— of cast iron or equivalent material has one end pivoted at —14— to a rocker arm —15— which in turn is pivoted at —16— to the base —1— so as to allow the carrier arm —13— to be moved longitudinally and vertically in a plane at substantially right angles to that of the jaws —3— and —4—.

A lever —17— of cast iron or equivalent material is pivoted at —18— upon the arm —13— and extends longitudinally thereof and, upon the corresponding ends of the arm —13— and lever —17—, are mounted a pair of gripping members —19— and —20—.

Interposed between the gripping members —19— and —20— is a disk —21— which is rotatingly mounted upon the upper end of a screw stud —22— by which the gripping member —19— is secured to the arm —13— leaving sufficient clearance between the faces of said gripping member and disk for the reception of one of the ears or lugs of the lens post —b—. That is, the upper end of the stud —22— upon which the disk —21— is mounted is reduced in diameter forming a shoulder to support the disk —21—. The gripping member —20— is secured to the underside of the lever —17— by means of a screw stud —23— and is provided with a central recess —24— for receiving a coil spring —25— which is compressed between the upper face of the disk —21— and upper wall of the socket —24— to frictionally hold the disk —21— against too free rotary movement, and at the same time permitting said disk to be adjusted rotarily to bring different parts thereof into position for receiving the lens post —b—. The disks —19— and —20— may be provided with alined threaded apertures —26— for receiving a binding post —26'— shown more clearly in Fig. 8 for one of the wires of the heating circuit shown more clearly in Fig. 8, said apertures serving to add additional cooling area to prevent overheating of the disks.

The gripping members —19— and —20— and interposed disk —21— are preferably circular and of relatively large size as compared with the parts to be soldered together and are made of the same diameter and of copper bronze or equivalent material of low electrical resistance and high heat conductivity so as to more effectively concentrate the current upon the articles to be soldered and also serve to dissipate any heat which may be transmitted thereto by reason of their large exposed surface areas.

The jaws or gripping members —19— and —20— are forced together or clamped upon the work by means of a spring —27— which is interposed between an extension —28— on the arm —13— and a suitable adjusting screw —29— on the adjacent end of the lever —17—, the screw —29— serving to vary the tension of the spring and thereby vary the power with which the article is gripped between the members —19— and —20—, said spring —27— being of greater tension than the spring 24 which is relatively light and merely serves to frictionally hold the disk —21— against undue rotation. If necessary, the jaws —19— and —20— may also be adjusted rotarily by simply loosening their respective clamping screws —22— and —23— and retightening them to hold them in their adjusted positions.

The articles as —b— which are to be soldered to the part —a— are placed in a suitable tray —29— which is supported upon an upright standard —30— rising from the main supporting bed or frame —1— in a plane below and to one side of the meeting faces of the gripping members —3— and —4—, said articles being fed from the tray —29— into a grooved guide —31— and across the upper end of a coacting spring jaw —32— having a vertical slot —33— into which the neck of the lens post —b— is adapted to drop as shown more clearly in Fig. 3, thereby temporarily holding said post in position to be engaged and gripped by the gripping members —19— and —20— in a manner hereinafter described.

The guide groove —31— is formed in the upper end of the upright standard —30— which is secured to and rises from the main supporting base —1— and to which the spring jaw —32— is secured as best seen in Fig. 9.

As shown in Fig. 1, the free end of the arm —13— carrying the gripping members —19— and —20— is normally supported upon a suitable rest —35— which is provided with a screwthreaded stem screwing into the base —1— and is therefore adjustable vertically to support the arm —13— at the desired height with the edge of the disk —21— in approximately the same horizontal plane as the space between the ears of the lens post —b— so that by depressing the lever —17— against the action of the spring —27— to open the jaw —20— and then advancing the arm —13— across and upon the rest —35—, the ears of the lens post —b— will enter the spaces between the disk —21— and adjacent faces of the gripping members —19— and —20—, while the edge of the disk —21— will enter between said ears and when pressure upon the lever —17— is released, the intervening portions of the lens post will be clamped between the members —19— and —20— and corresponding faces of the disk —21—, leaving a small portion of the post equal to the thickness of the spring guide —32— projecting beyond the periphery of the gripping members —19— and —20—. Prior to this operation, the bridge piece —a— is registered with the grooves —8— and —9— and held in a fixed position by the gripping members —3— and —4— with the inner enlarged head abutting against the inner face of said gripping members. While the bridge piece —a— is thus held in a fixed position, the arm —13— with the lens post —b— gripped between the jaws —19— and —20— is elevated and carried forwardly over the top of the guides —31— and —32— and across and upon a suitable rest —36— which is also provided with a screw stem adjustable in a threaded aperture in the bracket —2— so as to bring the center of the post in exact registration with the adjacent protruding end of the bridge piece —a— to contact therewith or rather to cause the adjacent spur —a²— to enter the aperture in the post.

Just before the lens post is brought into contact with the adjacent end of the bridge piece —a—, a small solder washer —h— is placed upon the adjacent spur so that when the nose piece is engaged with said spur or in contact with the adjacent end of the bridge piece during which the electric current is turned on by a suitable switch —s—, the heat developed at the junction of the two parts will fuse the solder and cause it to run into the joint, thereby firmly uniting said parts to each other with the assurance that said parts are properly assembled. In order that this action may be positive and expeditious, the groove in the spring finger —32— in which the part —b— is temporarily held is disposed in the same lengthwise vertical plane as the grooves —8— and —9— in the gripping members —3— and —4— and also in the same vertical plane as the longitudinal center of the gripping members —8— and —9—. This movement of the arm —13— and gripping jaws —8— and —9— to their soldering positions is facilitated by means of a pedal —38— and cable —39— connecting said pedal over the sheave —40— to a spring arm —41— which is secured to the rocker arm —15— thereby permitting the parts of the mounting to be brought together for soldering under yielding pressure to avoid any possibility of overstraining or deforming said parts.

The free end of the spring —41— is connected to the cable —39— by means of a screw —43— and jam nuts —44—, the screw being passed through an aperture in the end of the spring —41—.

The electric switch —a— is self-opening by any suitable means as a spring —s'— and is adapted to be closed automatically at about the same time that the parts to be united are brought into electrical contact and for this purpose I have shown the movable member of the switch as having a portion thereof projecting into the path of movement of the pedal —38— so that as the pedal is depressed for pressing the gripping members —19— and —20— with the lens post clamped between them toward the gripping members —3— and —4— in which the bridge piece —2— is held, said pedal will engage and close the switch —s— in the primary circuit of the transformer to energize the secondary circuit and clamping members —3— and —4— and —19— and —20— which are connected directly in said secondary circuit, thereby concentrating the electrical heat developed directly at the points or surfaces of contact of the members —a— and —b—.

The pivotal bearings —14— and —16— for the rocker arms —13— and —15— respectively preferably consist of adjusting screws engaged in threaded apertures in the adjacent portions of the rocker arm —15— and frame —1— to permit the rocker arms —13— and —15— to be adjusted laterally for the purpose of accurately alining the gripping portions of the clamping members —19— and —20— with the slot —33— in the temporary holder —32— and also with the grooves in the clamping members —3— and —4—, whereby as the gripping members —19— and —20— are advanced toward the temporary holder —32— they will be in correct position to grip the ears of the lens post and then to carry such post forwardly into exact registration with the inwardly protruding end of the bridge piece —a—, thereby causing the point —$a^2$— to register with and enter the aperture in the post without especial care on the part of the operator. The operation briefly described is as follows: Assuming that the carrier arm —13— is in its normal position with its free end bearing upon the rest —35— and that the jaws —8— and —9— are open, whereupon one of the bridge pieces —a— is placed by hand in the groove —8— with its enlarged head abutting against the end face of the jaw —3—, the upper jaw —4— is then closed upon the bridge piece to hold it in a fixed position after which one of the lens posts —b— is moved by hand from the tray —29— along the guide groove —31— where it drops into the slot —33— of the spring arm —32— and is there temporarily held until the jaw —20— is opened by depressing the free end of the lever —17— against the action of the spring —27—, and the carrier arm —13— is then advanced to engage the ears of the lens post —b— between the jaws —19— and —20— and adjacent faces of the disk —21— at which time the lever —17— is released to allow the jaws to grip the lens post. The carrier arm —13— is then raised and carried forward across and upon the rest —36— so as to register the aperture in the lens post with the inwardly projecting spur of the bridge piece after the solder washer has been placed upon said spur, during which operation the switch is closed and current from the transformer is allowed to flow through the opposite sets of gripping members to the contacting points or surfaces of the parts —a— and —b—, thereby fusing the solder and uniting such parts to each other, whereupon the gripping members may be released from gripping engagement with the united parts and returned to their normal positions allowing said united parts to be removed and the operation repeated.

It will be observed that the wires from opposite poles of the transformer are each connected by separate branch leads directly to their respective sets of gripping members —3— and —4— and —19— and —20— which being of low resistance allows the current to pass readily to the contact points or surfaces of the parts during the soldering operation, the rests —35— and —36— being made of fiber or other insulating material insulated from the frame —1— to prevent short circuits when the arm —13— is resting thereon.

The heating circuit is normally broken when the lever —13— is resting on the insulating block —35— by reason of the fact that the gripping disks —19— and —20—, to which one side of the circuit is connected, is withdrawn from the bracket —30— and also from the jaws —3— and —4— to which the other side of the circuit is connected. It, therefore, follows that the only possibility of closing the circuit before the disks —20— with one part of the mounting therebetween is brought into contact with the other part of the mounting, which is held by the jaws —3— and —4—, is when the disks —20— are moved toward the upper end of the bracket —30— to engage with the part of the mounting which is then supported by the bracket, but this is only for an instant when the disks are raised to bring the part of the mounting carried thereby into contact with that particular part of the mounting which is gripped between the jaws —3— and —4— with the solder washer between them at which time the two parts are welded together by the fusing of the solder caused by the closing of the circuit at that point.

What I claim is:

1. In an electric soldering machine, separate gripping devices for holding the parts to be soldered, one of said gripping devices having co-acting gripping members relatively movable one toward and from the other, one of said members having an independent adjustment rotarily to present different portions thereof to the soldering point, means for holding the rotarily adjustable member in its adjusted position, and means for supplying current to both gripping devices.

2. In an electric soldering machine, separate gripping devices for soldering the parts to be soldered, one of the gripping devices being movable into and out of registration with and toward and from the other device, a rest for temporarily supporting the movable device when in registration with the other device to cause the parts to be soldered to abut one against the other, and means for supplying current directly to the gripping members of said devices under sufficiently low voltage to prevent welding of the parts to be united when brought into contact with each other.

3. In an electric soldering machine, separate gripping devices for holding the parts to be soldered, one of said devices having rotarily adjustable gripping members, and means for supplying current of one polarity to the gripping members of one of the devices and of opposite polarity to the gripping members of the other device.

4. An electric soldering machine comprising a pair of gripping jaws for one of the parts to be joined, a spring having opposite ends connected to said jaws and normally holding them apart, a pair of gripping members and supports therefor pivoted to each other and movable toward and from the jaws for supporting the other part to be joined to the first named part, a guide rest along and upon which one of the supports is movable to register the part carried by the gripping members with that carried by the jaws and means for supplying current of one polarity to the spring and of another polarity to the gripping members.

5. An electric soldering machine comprising a pair of gripping jaws for one of the parts to be soldered, a pair of supports movable toward and from the gripping jaws and pivoted to each other, gripping members mounted on said supports, a guide rest for one of the supports in proximity to the gripping jaws, an additional rest for said support some distance from the jaws, a guide for the articles to be gripped by said members between said rests, and means for supplying current of one polarity to both of the jaws and of opposite polarity to both gripping members.

6. In an electric soldering machine, a pair of gripping jaws for one of the parts to be soldered, supports pivoted to each other and movable toward and away from the jaws, gripping members carried by the supports, separate guide rests for one of the supports at different distances from the jaws, a holder for the other part to be soldered to the first named part located between the rests, and means for supplying current to said jaws and to the gripping members.

7. In an electric soldering machine, a pair of jaws for holding one of the parts to be soldered, a pair of gripping members and supports therefor hinged to each other and movable toward and from the jaws, an additional gripping member mounted on one of the supports between the meeting faces of the gripping members for supporting another part between said members for application to the first named part and means for supplying current to the gripping jaws and to said members.

8. An electric soldering machine comprising a pair of gripping jaws, a support therefor, a rocking member movable toward and from the jaws, an arm pivotally connected to the rocking member, a lever pivoted to said arm, gripping members mounted respectively on said arm and lever, a guide rest for said arm to register the gripping members with the jaws, and means for supplying current to said jaws and to said gripping members.

9. In an electric soldering machine, a pair of gripping jaws, operating means therefor, a pair of gripping members, supports for the gripping members pivoted to each other movable toward and from the jaws, means for supplying current to said jaws and gripping members including a normally open electric switch and separate means for operating the supports for the gripping members toward the jaws and simultaneously closing the switch.

In witness whereof I have hereunto set my hand on this 31st day of October. 1911.

ARTHUR AVERY BACON.

Witnesses:
M. GOETCHINS,
WILLIAM J. ESPEY.